US011162658B2

(12) United States Patent
De Oliveira

(10) Patent No.: US 11,162,658 B2
(45) Date of Patent: Nov. 2, 2021

(54) LIGHTING ASSEMBLY WITH ILLUMINATIVE PANEL MEMBER

(71) Applicant: Hubbell Incorporated, Shelton, CT (US)

(72) Inventor: Avelino De Oliveira, Inman, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/770,933

(22) PCT Filed: Nov. 10, 2016

(86) PCT No.: PCT/US2016/061240
§ 371 (c)(1),
(2) Date: Apr. 25, 2018

(87) PCT Pub. No.: WO2017/083466
PCT Pub. Date: May 18, 2017

(65) Prior Publication Data
US 2018/0231707 A1 Aug. 16, 2018

Related U.S. Application Data

(60) Provisional application No. 62/253,219, filed on Nov. 10, 2015.

(51) Int. Cl.
| F21V 8/00 | (2006.01) |
| F21V 5/00 | (2018.01) |
| F21V 13/04 | (2006.01) |
| F21V 13/00 | (2006.01) |
| F21V 7/00 | (2006.01) |
| F21S 8/00 | (2006.01) |

(Continued)

(52) U.S. Cl.
CPC .................. F21V 5/00 (2013.01); F21S 8/00 (2013.01); F21V 7/0016 (2013.01); F21V 7/28 (2018.02);

(Continued)

(58) Field of Classification Search
CPC ...................................................... G02B 6/0031
(Continued)

(56) References Cited

U.S. PATENT DOCUMENTS 4,907,132 A 3/1990 Parker
6,522,794 B1 2/2003 Bischel et al.
(Continued)

FOREIGN PATENT DOCUMENTS

WO WO-2014006501 A1 * 1/2014 ........... G02B 6/0015

OTHER PUBLICATIONS

PCT International Preliminary Report on Patentability for corresponding PCT Application No. PCT/US2016/061240, dated May 15, 2018—9 pages.

(Continued)

*Primary Examiner* — Sean P Gramling
(74) *Attorney, Agent, or Firm* — Michael Best & Friedrich LLP

(57) ABSTRACT

Light emitting panel assemblies and panel members for light emitting panel assemblies are provided. In some embodiments, a light source can be positioned to provide light to the panel member at an input area along a primary surface of the panel member without requiring light to be input from an edge surface of the panel member. Light emitted into the panel member can be refracted, reflected, diffused, and/or transmitted from the panel member based on the refractive, reflective, and other optical properties of the panel member to provide a desired light output, such as a uniform light output along at least a portion of the primary surfaces of the panel member. In some embodiments, the light emitting assembly can include surface coatings, treatments, reflectors, and/or materials to manage the refraction, reflection, diffused and/or transmitted of light in the panel member.

19 Claims, 5 Drawing Sheets

(51) Int. Cl.
*F21V 7/28* (2018.01)
*F21Y 115/10* (2016.01)

(52) U.S. Cl.
CPC .............. *F21V 13/00* (2013.01); *F21V 13/04* (2013.01); *G02B 6/0031* (2013.01); *G02B 6/0035* (2013.01); *G02B 6/0068* (2013.01); *F21Y 2115/10* (2016.08)

(58) Field of Classification Search
USPC ......................................................... 362/609
See application file for complete search history.

(56) References Cited

U.S. PATENT DOCUMENTS

| | | | |
|---|---|---|---|
| 2006/0260571 A1 | 11/2006 | Sugie et al. | |
| 2010/0118563 A1* | 5/2010 | Shen .................... | G02B 6/0031 362/607 |
| 2012/0081882 A1* | 4/2012 | Im ..................... | G02F 1/133603 362/97.1 |
| 2015/0212250 A1* | 7/2015 | Tai ....................... | G02B 6/0031 362/609 |
| 2015/0316232 A1 | 11/2015 | Di Trapani et al. | |

OTHER PUBLICATIONS

PCT International Search Report and Written Opinion for corresponding PCT Application No. PCT/US2016/061240, dated Jan. 19, 2017—11 pages.

\* cited by examiner

LIGHTING ASSEMBLY WITH ILLUMINATIVE PANEL MEMBER

PRIORITY CLAIM

The present application is a 371 of International Application No. PCT/US2016/061240, titled "Lighting Assembly with Illuminative Panel Member," filed Nov. 10, 2016, which claims the benefit of priority of U.S. Provisional Application Ser. No. 62/253,219, titled "Lighting Assembly with Illuminative Panel Member," filed on Nov. 10, 2015, which is incorporated herein by reference.

BACKGROUND

Light emitting assemblies can be used for illumination for various spaces. Light emitting panel assemblies can include a panel member for conducting light, and controlling the light conducted by the panel member to be emitted from one or more light output areas along the length of the panel member. For instance, a light emitting panel assembly can receive light from an input area of the panel member. The light can be transmitted and reflected through the panel member such that a uniform light output distribution is provided along a surface of the panel member.

Typically, light emitting panel assemblies receive light from one or more light sources at an input area located along an edge of the panel member. Use of lighting sources along an edge of the panel member can limit the size and number of light sources that can be used in conjunction with the panel member. For instance, there may be limited opportunities to increase the size or number of light sources beyond a thickness associated with the panel member. For instance, if an edge of the panel member is ¼ inch thick, the space available for light sources to provide light to the panel member can be limited to ¼ inch.

SUMMARY

Aspects and advantages of embodiments of the present disclosure will be set forth in part in the following description, or may be learned from the description, or may be learned through practice of the embodiments.

One example aspect of the present disclosure is directed to a light emitting panel assembly. The light emitting panel assembly can include a light source and a panel member. The panel member can have a primary surface and a plurality of edge surfaces. The primary surface can have a surface area greater than a surface area of each of the plurality of edge surfaces of the panel member. The light source can be positioned to provide light to the panel member at an input area along the primary surface of the panel member. The light from the light source can be provided to the panel member such that light is propagated through the panel member.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
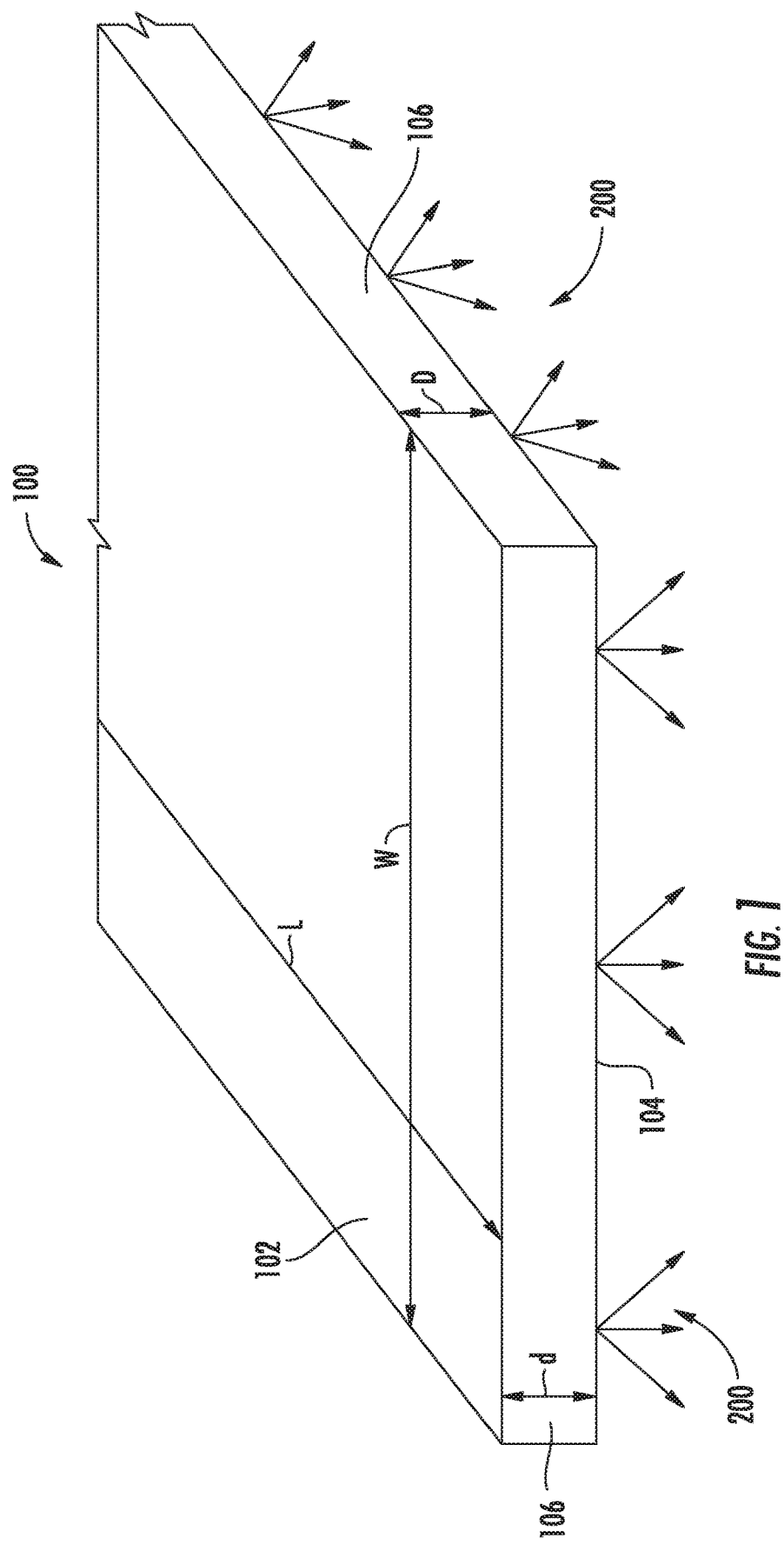
FIG. 1 depicts a perspective view of an example panel member according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a light emitting panel assembly that includes a panel member. The panel member can be a transparent panel member, translucent panel member, diffusive panel member or other panel member that transmits, spreads, scatters, and/or distributes light. For instance, in some embodiments, the panel member can be a diffuser such as, but not limited to, a ground glass diffuser, Teflon® diffuser, holographic diffuser, opal glass diffuser, or greyed glass diffuser.

The panel member can receive light from one or more light sources at an input area located on a primary surface of the panel member without requiring light to be input from an edge surface of the panel member. The panel member can have a refractive index such that light emitted into the panel member is bent when the light enters the panel member. The light is then transmitted through the panel member and reflected off the surfaces of the panel member so that the light continues to propagate through at least a portion the panel member. Portions of the light can be transmitted through the surfaces of the panel member to provide a desired light output, such as a uniform light output along at least a portion of the primary surfaces of the panel member.

In some embodiments, the panel member can include surface coatings, treatments, and/or materials to manage the refraction, reflection, diffusion, transmission, and/or emission of light in the panel member. For instance, reflective coatings can be used to reflect light back into the panel member to facilitate propagation of light through the panel member. Coatings with various refractive, diffusive, and reflective properties can be used to manage the light emission from the panel member to create effects such as frosting or other creative effects.

In some embodiments, a panel member can include one or more coatings with a different refractive index relative to the panel member. The difference in refractive index between the panel member and the coating can be used to manage reflection, refraction, and transmission of light in the panel member. For instance, a coating and/or treatment can be applied to a surface of the panel member at a location directly beneath a light source to reduce the transmission of light from the location such that the light output remains uniform or substantially uniform along a primary surface of the panel member. In some embodiments, the panel assembly can include metamaterials with negative refractive index to create additional lighting effects with the light output of the panel assembly.

The light emitting panel assemblies according to example embodiments of the present disclosure can provide increased flexibility in configuration and design and can be used to provide a variety of different lighting effects. For instance, the light emitting panel assemblies are not limited to receiving input light for illuminating a panel member from an edge location or surface. As a result, the location of the light sources for providing light to the panel member can be located anywhere along one or both primary surfaces of the panel member. Geometric changes to the panel member as well as surface coatings, treatments, reflectors, materials, and other structures can be used to manage lighting effects.

FIG. 1 depicts an example panel member 100 according to example embodiments of the present disclosure. The panel member 100 can be generally planar and can include a length L, a width W, and a depth D. The panel member 100 has opposing primary surfaces 102 and 104. The primary surfaces 102 and 104 can be associated with a greater surface area relative to the other surfaces of the panel member 100. For instance, the primary surface 104 and/or 102 can be associated with a surface area that is greater than the surface area associated with an edge surface 106. In some embodiments, the primary surfaces 102 and 104 can be defined by the length dimension (e.g., long dimension) and width dimension (e.g., second longest dimension) of the panel member 100. The panel member 100 can further include a plurality of edge surfaces 106. The edge surfaces 106 can be defined at least in part by a depth dimension D (e.g., the shortest dimension) of the panel member 100. In some embodiments, the depth dimension D can be significantly smaller than the length dimension L and the width dimension W, such as at least ten times smaller than the length dimension L and the width dimension W, such as at least 20 times smaller than the length dimension L and the width dimension W.

The panel member 100 can receive light at an input area from one or more light sources. The light received from the one or more light sources can be refracted and distributed through the panel member 100 and transmitted from the panel member 100 to provide a light output 200. In some embodiments, the light output 200 can be substantially uniform along a portion or all of a primary surface 102 of the panel member 100. The light output 200 can have other distributions without deviating from the scope of the present disclosure.

Figure 2:
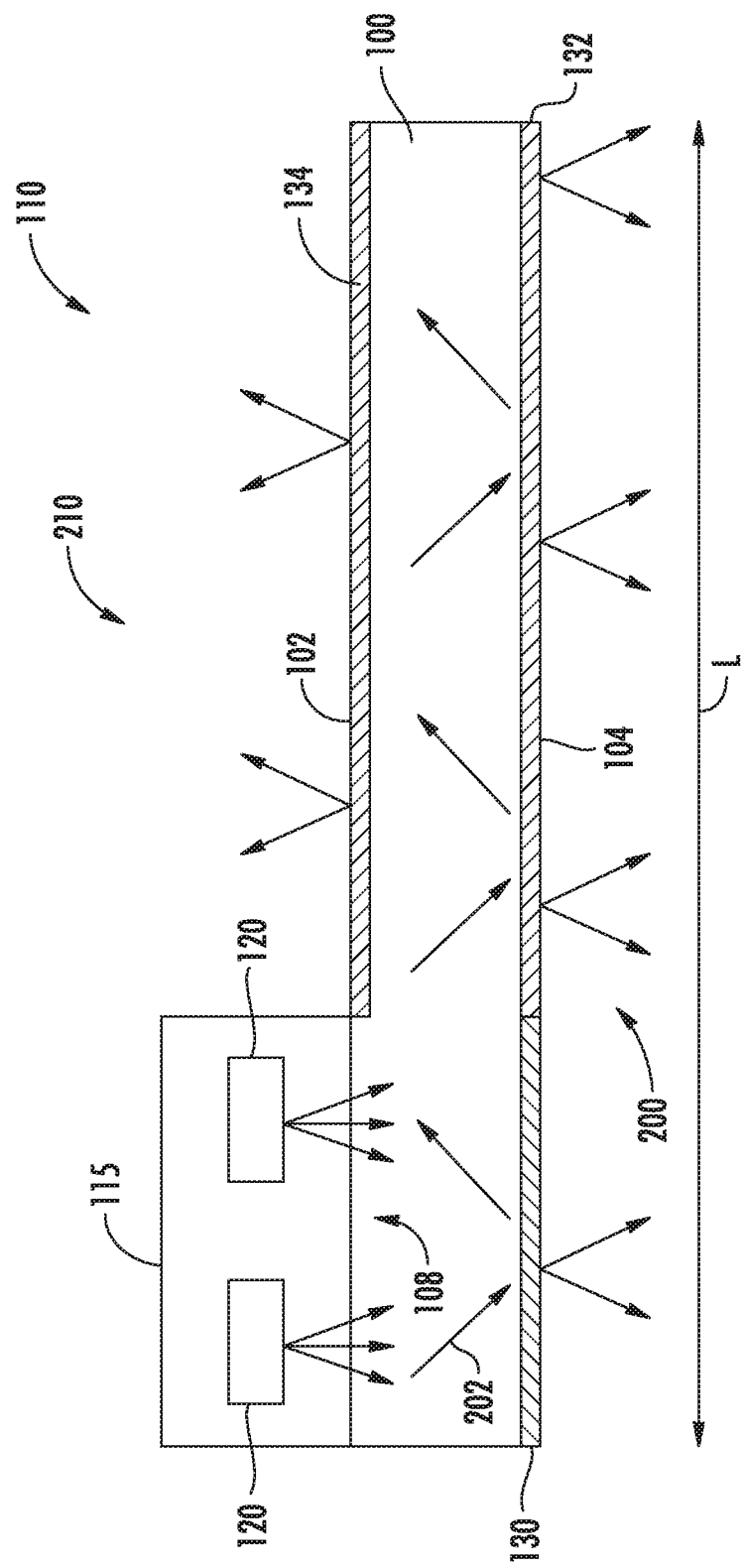
FIG. 2 depicts a cross-sectional view of an example light emitting panel assembly according to example embodiments of the present disclosure.

FIG. 2 depicts a cross-sectional view of one example light panel assembly 110 that includes a panel member 100 according to example embodiments of the present disclosure. As shown, the light panel assembly 110 includes a plurality of light sources 120 that are configured to emit light into an input area 108 of the panel member 100. The input area 108 can be defined in a primary surface 102 of the panel member 100.

The light sources 120 can be located in a housing 115 that can provide mechanical support for and/or protect the light sources 120. The light sources 120 can be in communication with a power source and various circuits (e.g., driver circuits, ballasts, etc.) that can be used to provide suitable power for the light sources 120. In some embodiments, the light sources 120 can be light emitting diode (LED) devices. LED devices can emit light as a result of electrons moving through a semiconductor material. Other suitable light sources can be used without deviating from the scope of the present disclosure, such as fluorescent light sources.

As shown in FIG. 2, the light emitted into the input area 108 of the panel member 100 can be refracted based on the refractive index of the panel member 100. At least a portion of the light can then be reflected in the panel member 100 so that light propagates through the panel member 100. In addition, the light can be transmitted from at least a portion of the primary surfaces 102 and 104 of the panel member 100 such that the light panel member 100 provides light output 200 from the primary surface 104 and light output 210 from the primary surface 102. In some embodiments, the light output 200 can be substantially uniform along at least a portion of a length L of the primary surface 104 of the panel member 100. In addition, the light output 210 can be substantially uniform along at least a portion of the length L of the primary surface 102.

The panel member 100 can be formed from a material having a refractive index that allows light input into the panel member 100 by the light sources 120 and to propagate through the panel member 100. In addition, the panel member 100 can include various geometries, structures (e.g., lens structures), and other properties to facilitate the propagation of light through the panel member 100.

As shown in FIG. 2, the panel member 100 can further include coatings/treatments and other structure to assist with the reflection, refraction, and transmission of light in the panel member 100. For instance, coating 134 can be located on and/or form a part of the primary surface 102. Coatings 130 and 132 can be located on and/or can form a part of primary surface 104 of the panel member 100. The coatings 130, 132, and 134 can have reflective properties (e.g., the ability to reflect light incident on the coating) sufficient to assist with propagation of light through the panel member 100. For instance, a portion of the light 202 propagating through the panel member 100 that is incident on the coatings 130, 132, and 134 can be reflected back into the panel member 100 for further propagation through the panel member 100.

The coatings 130, 132, and 134 can also allow for the transmission of light incident on the coating 130, 132, and 134 to provide light output, such as light output 200 from the primary surface 104 and light output 210 from the primary surface 102. In some embodiments, the refractive index of the coatings 130, 132, and 134 can be different from the refractive index of the panel member 100. The refractive index of the coatings 130, 132, and 134 can be selected to provide desired light output effects, such as desired transparency/frosting or other effects for the light emitting panel assembly.

In some embodiments, the refractive index of the coating 134 associated with the primary surface 102 can be different from the refractive index of the coatings 130 and 132 associated with the primary surface 104 such that the light output 200 from the primary surface 104 is different from the light output 210 from the primary surface 102. In addition and/or in the alternative, the coatings 130, 132, and 134 can be applied to primary surfaces 102 and 104 in a uniform and/or non-uniform manner to provide desired light output effects.

In some embodiments, a primary surface can have two or more different coatings with different refractive and/or reflective properties to provide a desired light distribution along the primary surface. For instance, as shown in FIG. 2, primary surface 102 can include two coatings 130 and 132. Coating 130 can have different reflective and refractive properties than coating 132. The difference in properties (e.g., magnitude, type) can be selected to provide desired light output effects.

In the example light panel assembly 110 of FIG. 2, the coating 130 is located directly across from input area 108. The coating 130 can have increased reflectivity relative to coating 132 located elsewhere on the primary surface 104 such that more light from the light sources input into the panel member 100 at the input area 108 is reflected back into the panel member 100. In addition, the refractive index and/or reflective properties of the coating 130 can be selected such that light transmitted through the coating 130 is substantially uniform relative to light transmitted elsewhere along the primary surface 104 of the panel member 100. In this way, the coatings, treatment, materials or other structures can be used so that the location of the light sources 120 is not readily apparent (e.g., as a bright spot) from the primary surface 104 of the panel member 104.

The coatings 130, 132, and 134 are illustrated as separate structures (e.g., layers) in FIG. 2 for purposes of illustration and discussion. Those of ordinary skill in the art, using the disclosures provided herein, will understand that the coatings can be implemented using other suitable structures or implementations, such as treatments and/or modifications directly to the surfaces of the panel member, without deviating from the scope of the present disclosure.

Figure 3:
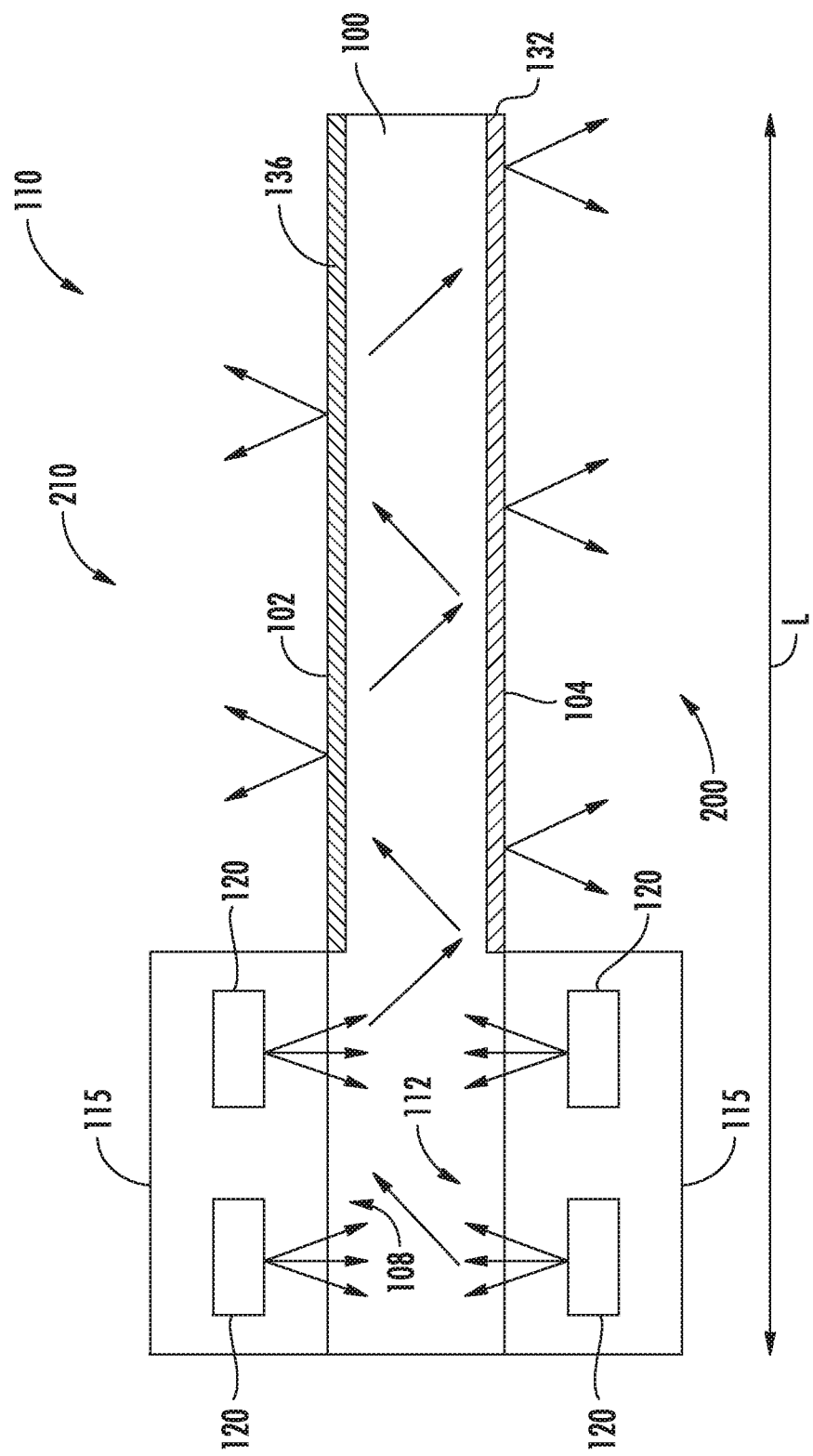
FIG. 3 depicts a cross-sectional view of an example light emitting panel assembly according to example embodiments of the present disclosure.

FIG. 3 depicts a light panel assembly 110 according to another example embodiment of the present disclosure. The light panel assembly 110 has similar features to the light panel assembly disclosed in FIG. 2. However, the light panel assembly 110 of FIG. 3 includes light sources 120 and, thus, can provide input light along both primary faces 102 and 104 of the panel member 100. More particularly, light sources 120 can provide input light at an input area 108 defined in primary surface 102. Additional light sources 120 can provide input light at an input area 112 defined in primary surface 104.

As shown in FIG. 3, the panel member 100 can include coating 132 along the primary face 104 and coating 136 along the primary face 102. The coating 132 can have reflective and refractive properties to assist with the reflection of light back into the panel member 100 for propagation through the panel member 100. In addition, the coating 132 can have reflective and refractive properties so that light is transmitted through the coating 132 as desired light output 200.

Coating 136 located on the primary face 102 can have different reflective and refractive properties relative to coating 132. For instance coating 136 can have optical properties (e.g., can be opaque) such that no light is transmitted through the coating 136. In this way, the panel member 100 can provide light output 200 only along the primary surface 104 of the panel member 100.

Figure 4:
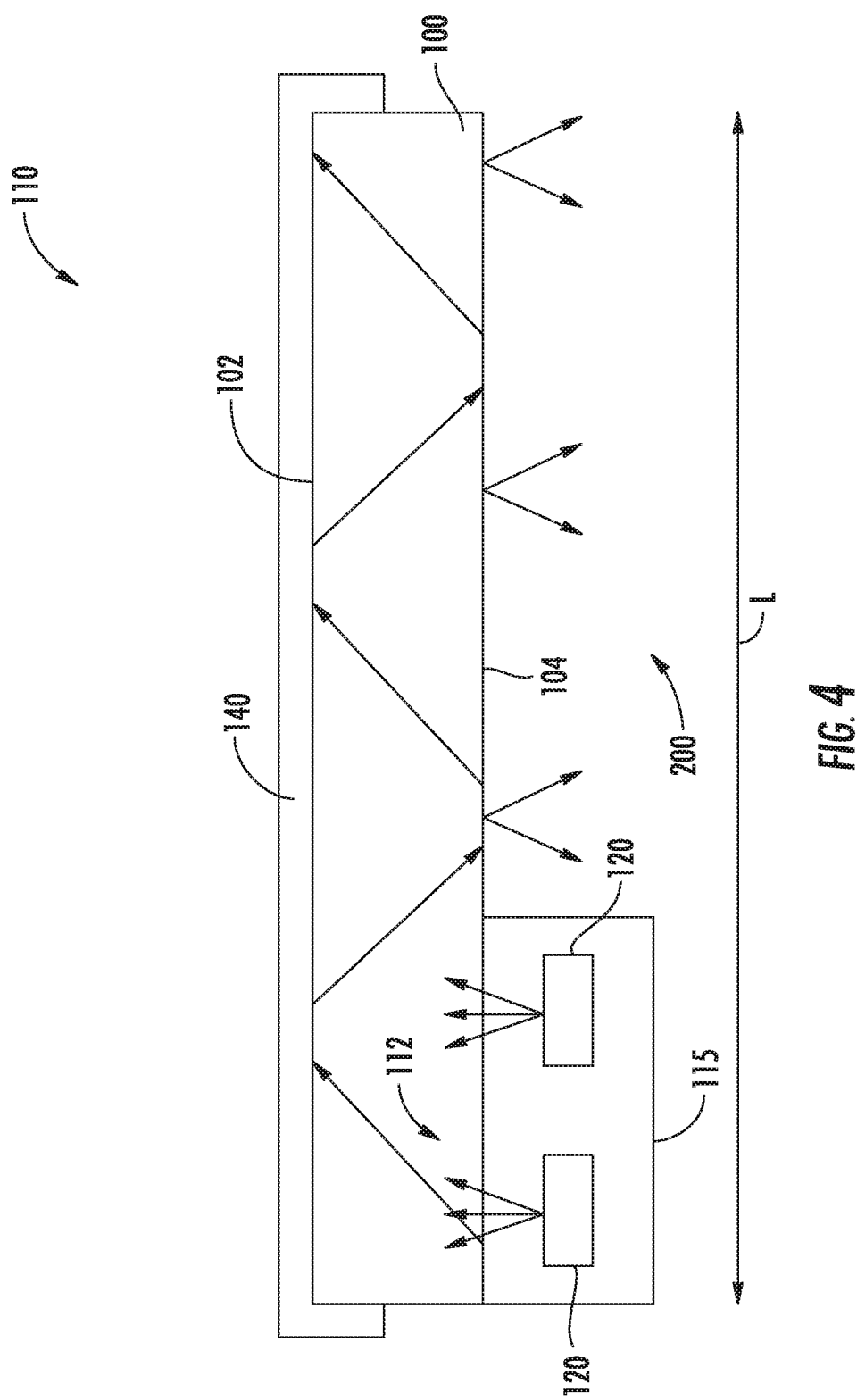
FIG. 4 depicts a cross-sectional view of an example light emitting panel assembly according to example embodiments of the present disclosure.

FIG. 4 depicts a light panel assembly 110 according to another example embodiment of the present disclosure. The light panel assembly 110 includes light source 120 that can emit light into an input area 112 defined in the primary face 104 of the panel member 100. The light sources 120 can be located in a housing 120. The light emitted into the panel member 100 can be propagated through the panel member 100 and transmitted from the primary face 104 of the panel member 100 as light output 200.

The light panel assembly 110 of FIG. 4 includes a reflector 140 disposed along the primary face 102 of the panel member 100. The reflector 140 can be a structure with highly reflective properties. The reflector 140 can have reflective properties and a geometry such that light propagating through the panel member 100 and incident on the reflector 140 is reflected back into the panel member 100. In this way, the reflector 140 can facilitate the propagation of light emitted from the light sources 120 through the panel member 100 such that panel member 100 provides a light output 200 along at least a portion of a length L of the primary face 104 of the panel member 100.

Figure 5:
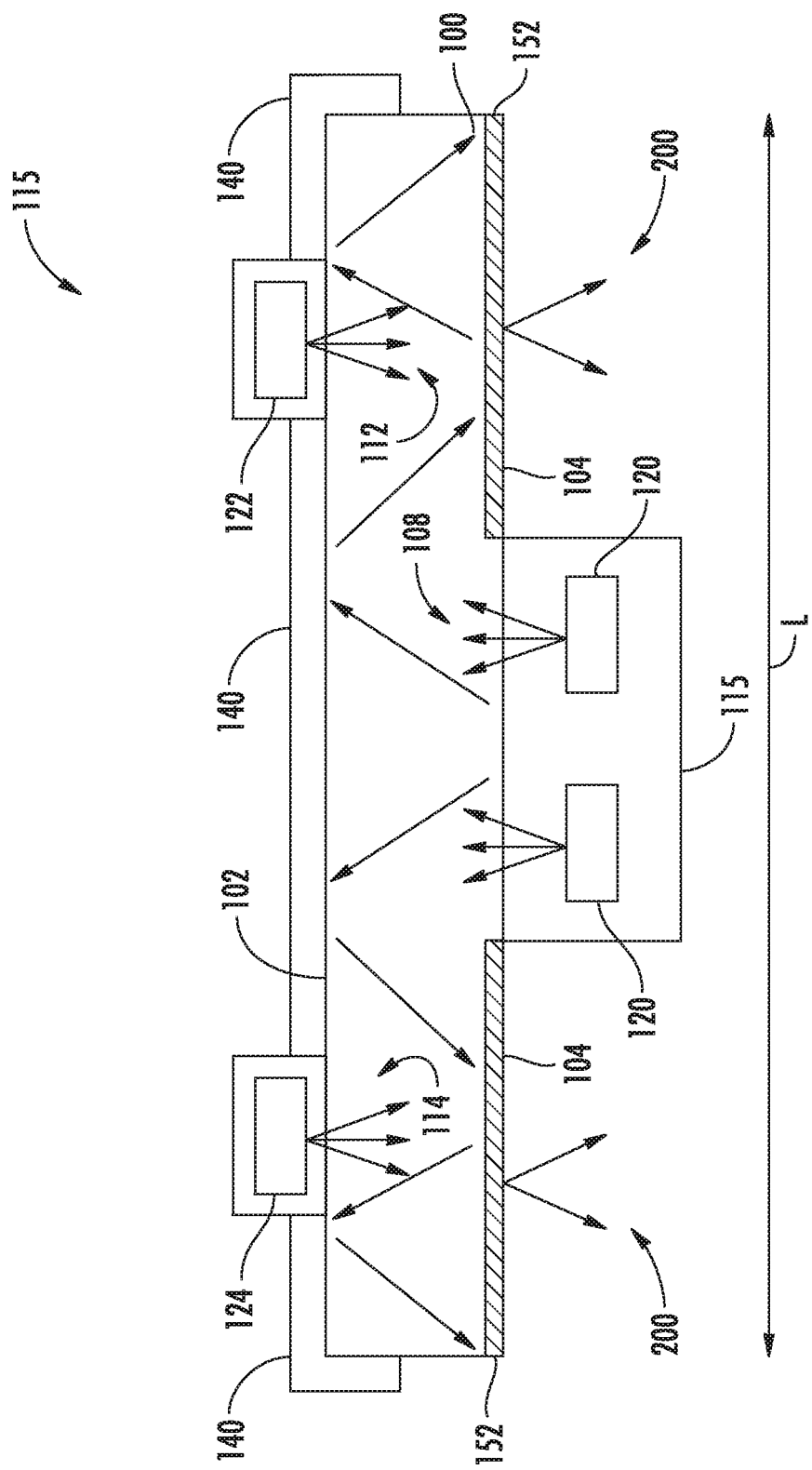
FIG. 5 depicts a cross-sectional view of an example light emitting panel assembly according to example embodiments of the present disclosure.

FIG. 5 depicts a light panel assembly 110 according to another example embodiment of the present disclosure. The light panel assembly 110 includes a first set of light sources 120 arranged to emit light into the panel member 100 at input area 108 defined in the primary face 104. The light panel assembly 110 further includes light sources 122 and 124 arranged to emit light into the panel member 110 at input area 112 and input area 114, respectively, which can be defined in the primary face 102 of the panel member 110.

The light emitting panel assembly 110 can include a reflector 140 disposed along the primary face 102 of the panel member 100. The reflector 140 can have reflective properties and a geometry such that light propagating through the panel member 100 and incident on the reflector 140 is reflected back into the panel member 100. The panel member 100 can include a coating 152 located along the primary face 104 of the panel member 100. The coating 152 can have reflective properties to provide a desired reflection of light back into the panel member 100 and transmission of light through the coating 152 to provide a desired light output 200 from the light emitting panel assembly 110.

As demonstrated in FIGS. 2-5, positioning light sources to provide light to the panel member at an input area along the primary surface of the panel member according to example aspects of the present disclosure can provide for wide flexibility in configuring light panel assemblies to provide desired light output. For instance, light sources can be positioned at different locations along the primary faces of the panel member. Coatings, treatments, reflectors, and other materials with many different optical properties can be used in a variety of combinations to provide a desired light output. Those of ordinary skill in the art, using the disclosures provided herein, will understand that the present disclosure is intended to encompass any such configurations.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A light emitting panel assembly, comprising:
   at least one light source;
   a panel member having a primary surface and a plurality of edge surfaces, the primary surface having a surface area greater than a surface area of each of the plurality of edge surfaces;
   wherein the at least one light source is positioned entirely outside of an interior of the panel member to emit light into the interior of the panel member through an input area on the primary surface of the panel member such that the light is propagated at least partially through the panel member and transmitted from a portion of the primary surface of the panel member to provide a light output along at least a portion of the primary surface of the panel, wherein the at least one light source is located within a housing positioned on the primary surface, and wherein the panel member comprises a first coating located directly across from the input area, the first coating having a refractive index that allows for transmission of light incident on the first coating but reduces the appearance of a bright spot associated with the light source, and the first coating positioned so that at least a portion of the light exiting the coating does not strike a reflector.

2. The light emitting panel assembly of claim 1, wherein the light output is substantially uniform along the primary surface of the panel member.

3. The light emitting panel assembly of claim 1, wherein the primary surface is defined by a length dimension and a width dimension, wherein each of the plurality of edge surfaces is defined at least in part by a depth dimension, wherein the length dimension is the longest dimension of the panel member, the width dimension is the second longest dimension of the panel member, and the depth dimension is smaller than the length dimension and the width dimension of the panel member.

4. The light emitting panel assembly of claim 3, wherein the depth dimension is at least ten times smaller than the length dimension.

5. The light emitting panel assembly of claim 1, wherein the light source comprises a light emitting diode (LED) light source.

6. The light emitting panel assembly of claim 1, wherein the panel member comprises a second coating associated with the primary surface, the second coating having a refractive index that is different from a refractive index associated with the panel member.

7. The light emitting panel assembly of claim 1, wherein the light output is substantially uniform along the entire primary surface.

8. The light emitting panel assembly of claim 6, wherein the second coating has a different refractive index than the first coating.

9. The light emitting panel assembly of claim 1, wherein the panel member comprises a first primary surface and a second primary surface, wherein the at least one light source comprises a first light source positioned to provide light to the panel member at a first input area along the first primary surface and a second light source positioned to provide light to the panel member at a second input area along the second primary surface.

10. The light emitting panel assembly of claim 9, wherein the first primary surface is associated with the first coating and the second primary surface is associated with a second coating, the first coating having different reflective and refractive properties relative to the second coating.

11. The light emitting panel assembly of claim 1, wherein the assembly comprises a reflector to facilitate propagation of light input through the input area along at least a portion of the panel member.

12. A light emitting panel assembly, comprising:
a panel member having a first primary face and an opposing second primary face;
a light emitting diode (LED) light source positioned entirely outside of an interior of the panel member to emit light into the interior of the panel member through an input area on the first primary face; and
a first coating disposed on the second primary face at a location directly opposite the input area, the first coating having a refractive index that allows for transmission of light incident on the first coating but reduces the appearance of a bright spot associated with the light source, wherein the light propagates at least partially through the interior of the panel member and is transmitted from the first primary face to provide a substantially uniform light output along the first primary face, wherein the LED light source is located within a housing positioned on the first primary face, and wherein the first coating positioned so that at least a portion of the light exiting the coating does not strike a reflector.

13. The light emitting panel assembly of claim 12, wherein the light propagates at least partially through the interior of the panel member and is transmitted from a portion of the second primary face to provide light output from the second primary face.

14. The light emitting panel assembly of claim 12, wherein the light emitting panel assembly comprises a second coating associated with the second primary face, the second coating having a different refractive index relative to the first coating.

15. The light emitting panel assembly of claim 14, wherein the light emitting panel assembly comprises a third coating associated with the first primary face, the third coating having a different refractive index relative to the first coating and the second coating.

16. The light emitting panel assembly of claim 12, wherein properties of the first coating are selected to provide a substantially uniform light output along the entire second primary face.

17. The light emitting panel assembly of claim 12, wherein the panel member has a rectangular shape having a length dimension, a width dimension, and a depth dimension, the length dimension being the longest dimension of the panel member, the width dimension being the second longest dimension of the panel member, the depth dimension being smaller than the length dimension and the width dimension.

18. The light emitting panel assembly of claim 17, wherein the first primary face and the second primary face are defined by the length dimension and the width dimension of the panel member.

19. The light emitting panel assembly of claim 18, wherein the depth dimension is at least ten times smaller than the length dimension.

* * * * *